United States Patent [19]
Burnham

[11] Patent Number: 5,192,648
[45] Date of Patent: Mar. 9, 1993

[54] PHOTOGRAPHIC FILM AND CARTRIDGE

[75] Inventor: William L. Burnham, Leroy, N.Y.

[73] Assignee: Eastman Kodak Company, Rochester, N.Y.

[21] Appl. No.: 838,119

[22] Filed: Feb. 18, 1992

[51] Int. Cl.[5] .............................................. G03C 3/00
[52] U.S. Cl. ..................................... 430/496; 430/333; 430/644; 430/394; 430/501; 354/94; 354/159
[58] Field of Search ............... 430/394, 396, 501, 496, 430/9, 11, 22, 333, 494, 644; 354/94, 95, 110, 120, 159

[56] References Cited

U.S. PATENT DOCUMENTS

| | | | |
|---|---|---|---|
| 763,024 | 6/1904 | Schmid | 430/501 |
| 1,588,869 | 6/1926 | Wolk | 430/14 |
| 3,086,862 | 4/1963 | Eagle et al. | 96/78 |
| 3,678,834 | 7/1972 | Melillo | 354/159 |
| 4,249,812 | 2/1981 | Hall | 354/120 |
| 4,357,102 | 11/1982 | Taren et al. | 355/77 |
| 4,402,597 | 9/1983 | McCormick-Goodhart | 355/64 |

*Primary Examiner*—Charles L. Bowers, Jr.
*Assistant Examiner*—Mark F. Huff
*Attorney, Agent, or Firm*—Roger A. Fields

[57] ABSTRACT

A photographic film comprises an elongated light-sensitive strip having a longitudinal series of similar size rectangular exposure areas whose proportion of the width to the height is less than 2:1. Each exposure area is pre-exposed along a top-most portion and/or a bottom-most portion to limit the useable size of each exposure area during picture-taking to one whose proportion of the width to the height is at least 2:1. Thus, the useable size of each exposure area provides a panorama-like image format.

6 Claims, 1 Drawing Sheet

PHOTOGRAPHIC FILM AND CARTRIDGE

BACKGROUND OF THE INVENTION

The invention relates generally to the field of photography, and in particular to photographic film and cartridges.

2. Description of the Prior Art

U.S. Pat. No. 4,357,102, issued Nov. 2, 1982, discloses a 35 mm camera which has a viewfinder window that is masked along its top and bottom portions by an insert to make the scene viewed through the non-masked portion of the viewfinder window have an aspect ratio, i.e. the proportion of the width to the height, greater than 2:1 rather than the standard ratio 1.5:1. As a result, the view through the viewfinder window has a panorama-like format or appearance. When a picture is taken using conventional 35 mm film, the resulting negative is a standard one, that is, 36.4 mm × 24.4 mm, having an aspect ratio 1.5:1. To obtain a print corresponding to the view through the viewfinder window, the film gate in an enlarger must be masked to provide an aperture with the same aspect ratio as that of the non-masked portion of the viewfinder window. Thus, a panorama-like print is obtained from the standard size negative by printing a select area of the negative having an aspect ratio greater than 2:1.

The recently introduced "FunSaver Panoramic 35" camera, manufactured by Eastman Kodak Company, is a modified 35 mm camera having a viewfinder window and an exposure opening each dimensioned to have an aspect ratio greater than 2:1 rather than the standard ratio 1.5:1. As a result, the 35 mm negative as well as the scene viewed through the viewfinder window has a panorama-like appearance. Since the negative has panorama-like dimensions, the printing operation is simplified as compared to the one called for in U.S. Pat. No. 4,357,102.

SUMMARY OF THE INVENTION

According to the invention, a photographic film comprising an elongated light-sensitive strip having a longitudinal series of similar size rectangular exposure areas whose proportion of the width to the height is less than 2:1, is characterized in that:

each exposure area is pre-exposed along a topmost portion and/or a bottom-most portion to limit the useable size of each exposure area during picture-taking to one whose proportion of the width to the height is at least 2:1, whereby the useable size of each exposure area provides a panorama-like image format.

More particularly, a photographic film comprising an elongated light-sensitive strip having two parallel longitudinal edges and two series of perforations located inwardly in close proximity to the respective longitudinal edges, is characterized in that:

the light-sensitive strip has two continuously pre-exposed, relatively narrow longitudinal bands located inwardly in close proximity to the respective series of perforations and a single continuously unexposed, relatively wide longitudinal band located between the two pre-exposed bands sections substantially for the length of the pre-exposed bands.

BRIEF DESCRIPTION OF THE DRAWING

The drawing is a single figure showing a preferred embodiment of the photographic film and a cartridge for the film.

DETAILED DESCRIPTION OF THE PREFERRED EMBODIMENT

Figure 1:
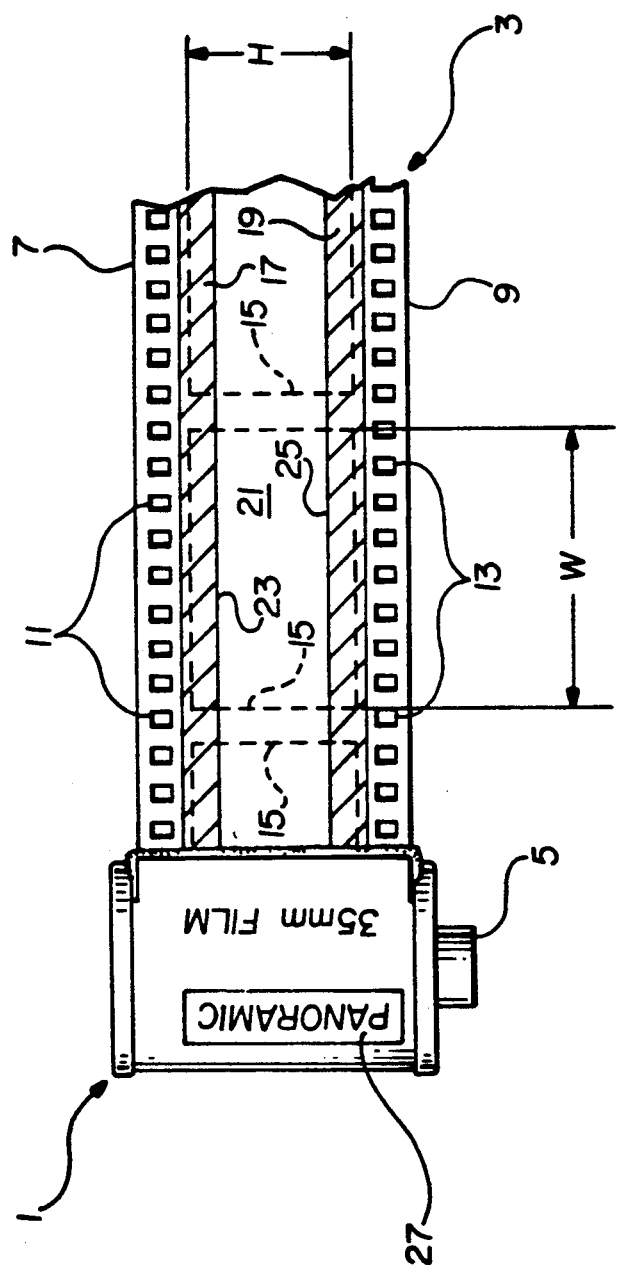

The invention is disclosed as being embodied preferably in 35 mm film and a known cartridge for the film. Because the features of this type of film and cartridge are generally well known, the description which follows is directed in particular to elements forming part of or cooperating directly with the disclosed embodiment. It is to be understood, however, that other elements not specifically shown or described may take various forms known to persons of ordinary skill in the art.

Referring now to the drawing, there is shown a known light-tight cartridge 1 such as manufactured by Eastman Kodak Company and an improved 35 mm film 3 normally stored in roll form on a spool 5 inside the cartridge. The film 3 comprises an elongated light-sensitive strip 3 having two parallel longitudinal edges 7 and 9 and two series 11 and 13 of perforations located inwardly in close proximity to the respective longitudinal edges. As is standard, the light-sensitive strip 3 has a series of potential exposure areas 15 whose width W and height H dimensions are approximately 36.4 mm × 24.4 mm. Thus, the proportion of the width W to the height H, i.e. the aspect ratio, is approximately 1.5:1.

According to the invention, the light-sensitive strip 3 has two continuously pre-exposed, relatively narrow longitudinal bands or sections 17 and 19 located inwardly in close proximity to the respective series 11 and 13 of perforations. However, there remains a single continuously unexposed, relatively wide longitudinal band or section 21 located between the two pre-exposed bands 17 and 19 substantially for the length of the two pre-exposed bands. As a result, each potential exposure area 15 is pre-exposed along a top-most portion 23 and a bottom-most portion 25 to limit the useable size of each exposure area during picture-taking with a conventional camera to one whose aspect ratio is preferably 2.73:1, i.e. the useable size is approximately 36.4 mm × 13.33 mm. Thus, the useable size of each exposure area 15 provides a panorama-like image format for picture-taking.

The cartridge 1 includes on its exterior a visible indication 27 that each exposure area 15 provides a panorama-like image format.

The invention has been described with reference to a preferred embodiment. However, it will be appreciated that variations and modifications can be effected within the ordinary skill in the art without departing from the scope of the invention. For example, the two pre-exposed bands 17 and 19 could extend outwardly to the respective longitudinal edges 7 and 9 of the light-sensitive strip 3.

I claim:

1. A photographic film comprising an elongated light-sensitive strip having a longitudinal series of similar size rectangular exposure areas whose proportion of the width to the height is less than 2:1, is characterized in that:

each exposure area is pre-exposed along a topmost portion and/or a bottom-most portion to limit the useable size of each exposure area during picture-taking to one whose proportion of the width to the height is at least 2:1, whereby said usable size of each exposure area provides a panorama-like image format.

2. A photographic film comprising an elongated light-sensitive strip having a longitudinal series of similar size rectangular exposure areas whose proportion of the width to the height is approximately 1.5:1, is characterized in that:

each exposure area is pre-exposed along a topmost portion and/or a bottom-most portion to limit the useable size of each exposure area during picture-taking to one whose proportion of the width to the height is greater than 2.5:1, whereby said useable size of each exposure area provides a panorama-like image format.

3. A photographic film comprising an elongated light-sensitive strip having two parallel longitudinal edges and two series of perforations located inwardly in close proximity to said respective longitudinal edges, is characterized in that:

said light-sensitive strip has two continuously pre-exposed, relatively narrow longitudinal bands located inwardly in close proximity to said respective series of perforations and a single continuously unexposed, relatively wide longitudinal band located between said two pre-exposed bands substantially for the length of the pre-exposed bands.

4. A photographic film as recited in claim 3, wherein the distance between said two pre-exposed bands is less than 24 mm.

5. A film cartridge comprising a container, and an elongated light-sensitive strip rolled in said container and having a longitudinal series of similar size rectangular exposure areas whose proportion of the width to the height is less than 2:1, is characterized in that:

each exposure area is pre-exposed along a topmost portion and/or a bottom-most portion to limit the useable size of each exposure area during picture-taking to one whose proportion of the width to the height is at least 2:1; and said container includes a visible indication that said light-sensitive strip is pre-exposed in each exposure area.

6. A method of manufacturing a photographic film comprising an elongated light-sensitive strip having a longitudinal series of similar size rectangular exposure areas whose proportion of the width to the height is less than 2:1, is characterized by the step of:

pre-exposing each exposure area along a top-most portion and/or a bottom-most portion to limit the useable size of each exposure area during picture-taking to one whose proportion of the width to the height is at least 2:1 whereby said useable size of each exposure area provides a panorama-like image format.

* * * * *